US008790186B1

(12) United States Patent
Dethloff et al.

(10) Patent No.: US 8,790,186 B1
(45) Date of Patent: Jul. 29, 2014

(54) USER-CONTROLLED ENTERTAINMENT SYSTEM, APPARATUS AND METHOD

(71) Applicant: NTN Buzztime, Inc., Carlsbad, CA (US)

(72) Inventors: Trent Dethloff, San Diego, CA (US); Timothy James Tembreull, Carlsbad, CA (US); Charles Marc Bernstein, Carlsbad, CA (US); David LaTour, Golden Valley, MN (US)

(73) Assignee: NTN Buzztime, Inc., Carlsbad, CA (US)

( * ) Notice: Subject to any disclaimer, the term of this patent is extended or adjusted under 35 U.S.C. 154(b) by 0 days.

(21) Appl. No.: 14/173,923

(22) Filed: Feb. 6, 2014

(51) Int. Cl.
*A63F 13/12* (2006.01)

(52) U.S. Cl.
USPC .......................................................... 463/42

(58) Field of Classification Search
IPC ....................................................... A63F 13/12
See application file for complete search history.

(56) References Cited

U.S. PATENT DOCUMENTS

| 5,738,583 A * | 4/1998 | Comas et al. ................... 463/40 |
| 2008/0242421 A1 * | 10/2008 | Geisner et al. ................... 463/42 |

* cited by examiner

*Primary Examiner* — Omkar Deodhar
(74) *Attorney, Agent, or Firm* — Thibault Patent Group

(57) ABSTRACT

A system, method, and apparatus for allowing a wireless communication device operator to control aspects of a multi-player game are described. In one embodiment, a server sends a signal to a plurality of wireless communication devices indicating an availability of an exclusive privilege for one of the wireless communication device operators to exclusively control one or more aspects of the multi-player game. Next, a request is received from a first wireless communication device for a first wireless communication device operator to receive the exclusive privilege. Then, the server determines whether another wireless communication device operator has already been assigned the exclusive privilege to play the multi-player game; if not, the exclusive privilege is assigned to the first wireless communication device. Finally, the server sends a confirmation to the first wireless communication device indicating that the first wireless communication device operator has been granted the exclusive privilege.

20 Claims, 9 Drawing Sheets

(Final)

USER-CONTROLLED ENTERTAINMENT SYSTEM, APPARATUS AND METHOD

BACKGROUND

Description of the Related Art

Entertainment in the form of electronic trivia games has been available in public venues such as bars and restaurants for many years. In the past, bars and restaurants have provided their patrons with custom wireless gaming consoles that allow the patrons to participate in trivia games. The trivia games are hosted by a computer server located in the venue or located remotely from the venue, and automatically provides trivia questions and potential answers to the patrons via one or more public monitors located in the venue. Patrons read the trivia questions and potential answers on the public monitors, and select one of the potential answers via their gaming console, which transmits the patrons' answers wirelessly to the server. After a predetermined time period, the correct answer is provided by the server to the public monitor, and patrons are awarded points by the server until a game conclusion is reached, typically after a predetermined number of trivia questions have been posed.

More recently, venues of many types have begun to offer a wide variety of entertainment services, in addition to trivia games, to their patrons. For example, many bars, restaurants, sporting venues, concert halls, shopping venues, have begun offering entertainment to their patrons in the form of poker, sports-related games, bingo, music playback via in-venue jukeboxes, videos, television shows, and other entertainment. Patrons typically use mobile devices, such as custom tablet computers, personal Smartphones, public monitors, portable computers, or a combination of these devices, to participate in the entertainment provided by the venue. However, the venue server or off-site server is always in control of what types of entertainment is available to patrons, when the entertainment will become available to patrons, and general aspects of the entertainment, such as a rate of game play. For example, the server may offer several types of trivia games, each type occurring at one or more predetermined times during the day or evening. Thus, a patron wishing to play a particular type of trivia game must wait until it is offered by the server.

Another problem with previous entertainment services offered by public venues is that the pace of the game is also only controlled by the venue server or off-site server. For example, during a trivia game, many aspects of the game are presented at predetermined time intervals, such as the time between each question, the time that potential answers are displayed after each question is revealed, the time given to patrons to answer each question, etc. Thus, a pause in game play is not possible, for example to allow some patrons extra time to answer a question, to pause game play for any variety of reasons, to increase the speed of the game to account for a majority of patrons that are generally impatient, or to decrease the speed of the game to account for a majority of patrons that require extra time to answer questions.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter The embodiments described herein relate to systems, methods and apparatus for providing user-controlled entertainment services. In one embodiment, a server is described, comprising a communication interface for sending and receiving information from a plurality of wireless communication devices over a network, a memory for storing processor-executable instructions, and a processor coupled to the memory and the communication interface for executing the processor-executable instructions that cause the server to send a signal to the plurality of wireless communication devices indicating an availability of the multi-player game and an indication of an availability of an exclusive privilege for one of the wireless communication device operators to exclusively control one or more aspects of the multi-player game, receive a request from a first wireless communication device for a first wireless communication device operator to receive the exclusive privilege, determine whether another wireless communication device operator has already been assigned the exclusive privilege to play the multi-player game, assign the exclusive privilege to the first wireless communication device if the exclusive privilege has not been assigned to another wireless communication device operator, and send a confirmation to the first wireless communication device indicating that the first wireless communication device operator has been granted the exclusive privilege.

In another embodiment, a wireless communication device for allowing an operator of the wireless communication device to control one or more aspects of a multi-player game offered by a server, comprising a communication interface to transmit and receive information with the server, a user interface to display information to the operator and to receive input from the operator, a memory for storing processor-executable instructions, and a processor coupled to the communication interface, the user interface, and the memory for executing the processor-executable instructions that cause the wireless communication device to request an exclusive right to control one or more aspects related to the multi-player game from the server, receive the exclusive right to control one or more aspects related to the multi-player game, and after the game has started, transmit a command to the server for controlling an aspect of the multi-player game as the game is being played.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The present application relates to providing user-controllable entertainment services to individuals via wireless communication devices operated by the individuals. For example, a multi-player game can be initialized by an individual via an application running on the individual's smartphone, advertise availability and particulars about the game to other players, then control the pace or other aspects of the game via the individual's wireless communication device.

Figure 1:
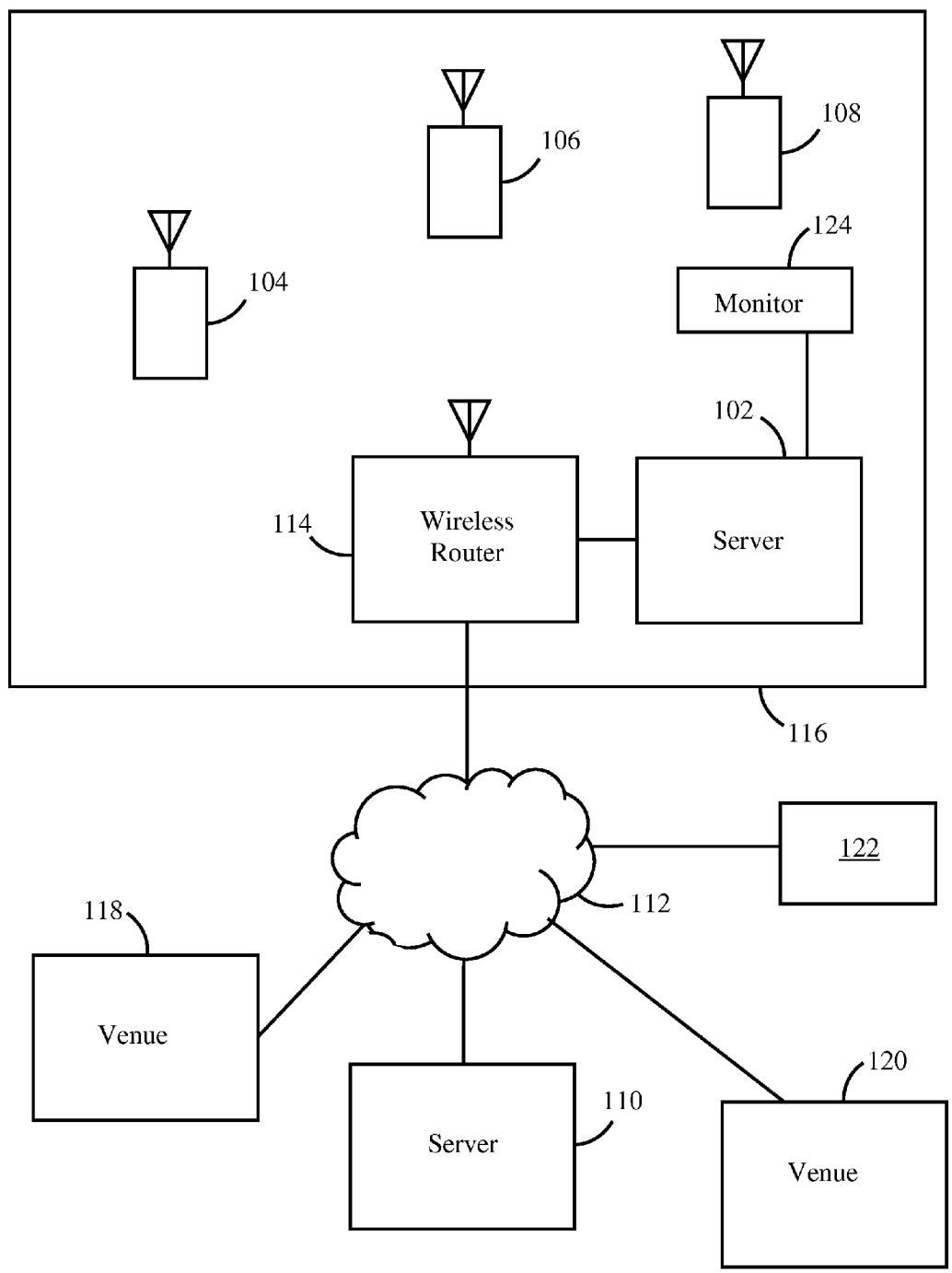
FIG. 1 illustrates one embodiment of a system for allowing a wireless communication device operator to control one or more aspects of a multi-player game offered by a server.

FIG. 1 illustrates system 100 for providing user-controllable entertainment services to operators of wireless communication devices. For example, system 100 may provide a gaming environment that allows a wireless communication device operator to control aspects of a multi-player game offered by server 100. In the embodiment shown in FIG. 1, system 100 comprises server 102 located within venue 116, and three wireless communication devices 104, 106, and 108 also located within venue 116. System 100 may optionally include remote server 110 in communication with server 102 via wide area network 112 and wireless router 114. In another embodiment, entertainment services are provided by remote server 110 to the wireless communication devices without the use of server 102, such as in an embodiment where the entertainment services are provided to venue 116 remotely over wide area network 112. Although only three wireless communication devices are shown in FIG. 1, in practical applications, a plurality of wireless communication devices is typically found within venue 116 and provided with entertainment services from server 102, server 110, or a combination of both. For example, server 110 may communicate with server 102 to provide server 102 with initial entertainment services or updated entertainment services in the form of software such as executable computer code.

System 100 may additionally comprise one or more public viewing monitors 124. Such public viewing monitors are commonplace in venues such as bars and sporting events for providing visual information such as images, videos, advertisements, television shows, sporting events, etc. to a number of patrons or customers within a venue. Each public viewing monitor 124 typically comprises a video display, such as an LCD or LED display, which may include a tuner for allowing viewers to watch a particular channel out of a number of channels provided by server 102/110 or some other source. The public viewing monitors also typically comprise an audio output device, such as speakers, for allowing patrons and customers to hear audio information associated with the visual information displayed by the monitors.

Each of the wireless communication devices 104, 106, and 108 comprise a portable electronic computing device capable of wireless communication with server 102/110, such as a Smartphone, tablet computer, laptop computer, or any other device capable of wireless communications with a cellular data network or a local data network such as a Wi-Fi LAN provided by wireless router 114. For example, wireless communication device 104 may comprise one of a variety of Wi-Fi enabled tablet computers sold by a variety of computer manufacturers, such as the iPad tablet computer manufactured by Apple Computer of Cuppertino, Calif., or the Galaxy Tab tablet computer manufactured by Samsung Electronics of Seoul, Korea. In other embodiments, one or more of the wireless communication devices may comprise a Smartphone, such as an iPhone manufactured by Apple Computer. In one embodiment, any one of wireless communication devices 104, 106, and 108 comprise a tablet computer specially provisioned by venue 116. For example, a restaurant chain may provision a plurality of customized tablet computers for use in their venues, the tablet computer comprising the restaurant chain's logo as wallpaper, and pre-loaded with a number of "apps" for allowing certain types of entertainment, advertisements, or user-activity to occur via these tablets, such as an ability for patrons to order food or beverages, select music for play on a jukebox, to play games, and to pay for the aforementioned activities. The apps typically work in conjunction with server 102 and/or server 110 by transmitting and receiving messages related to the entertainment and other services. The customized tablets may be provided to customers as they arrive on the provider's premises. For example, a restaurant/bar may provide a customized tablet to each customer seated at tables located throughout the restaurant/bar. In any case, each wireless communication device typically comprises a display for presenting visual information to customers, a user input device, such as a keypad, microphone, touchpad, or other known input device, to receive information from customers, and a communication interface that allows signals to be transmitted and received to/from the wireless communication devices.

In one embodiment, a networked computer operator using networked computer 122 could also be granted permission to control a multi-player game in addition to operators of the wireless communication devices in venues 116, 118, and 120. Additionally, off-site wireless communication devices could participate in entertainment services offered by a venue. For example, a Smartphone could be used to receive alerts from venue 116 when a favorite trivia game offered by venue 116 is about to begin. In response to receiving the alert, an operator of the Smartphone could participate in the trivia game by registering with server 102 and/or server 110, and play the game as if the operator was located within venue 116.

The same entertainment services provided by server 102 and/or server 110 may also be provided to one or more other venues, such as venue 118 and venue 120 as shown in FIG. 1. Each venue 116, 118, and 120 is a public venue such as a bar, restaurant, nightclub, sporting event venue, casino, hotel, retail store, Laundromat, or any other public venue where entertainment services may be provided to customers or patrons of such public venues. A number of wireless communication devices similar to WCDs 104, 106, and 108 may be located within these other venues and participate in games played with or against wireless communication devices within their respective venues, or with or against wireless communication devices located at other venues.

Entertainment services provided by the venues may comprise providing multi-player games to venue customers and patrons, such as trivia, poker, bingo, and sports games such as QB1 offered by NTN Buzztime of Carlsbad, Calif., where players try to predict the next play of a live football game. For example, a trivia game may comprise server 102/110 providing questions to customers and patrons located in one or more venues, then providing several possible answers to each question. The questions and possible answers are typically transmitted to customers' wireless communication devices, which may comprise a personal smartphone or tablet computer, or a tablet computer provided by a venue to their customers. The wireless communication devices are used by customers to select one of the possible answers and to transmit the selected answer to server 102/110. After a predetermined time period after the question is posed, for example 30 seconds, server 102/110 reveals the correct answer to customers via their wireless communication devices and/or one or more public viewing monitors 124 located within the venue(s).

System 100 allows patrons or customers of venues to control various aspects of such entertainment services provided by system 100. For example, a patron of venue 116 operating wireless communication device 106 may be able to select a game offered by server 102 and be granted "host" privileges by server 102/110. Host privileges may include an exclusive ability, i.e., not given to any other wireless communication device operator, to control certain "aspects" of a game, such as game type, an ability to restrict the game to only certain other wireless communication devices (for example, within venue 116 and/or within venue 116 and other venues), an ability to control the pace of game play (e.g., an ability to pause or advance the game to a subsequent state), an ability to specify a game start time, an ability to specify a game duration, an ability to select tie breakers (e.g., a type of tie-breaking game, typically comprising one round of such a tie-breaking game), or other aspects of the game. A game "state" may be referred to as a certain point of play as a game is played. For example, a first state may comprise a "pre-game" state prior to the actual start of the game. Another state might comprise a state of game play after a trivia question is posed by server 102/110 but before a set of possible answers is provided by server 102/110. Another state might comprise a state of game play after a bingo ball is drawn or a card is displayed in a poker game. Yet another state of a game might comprise a state of game play after one or more possible answers are displayed to players.

Figure 2:
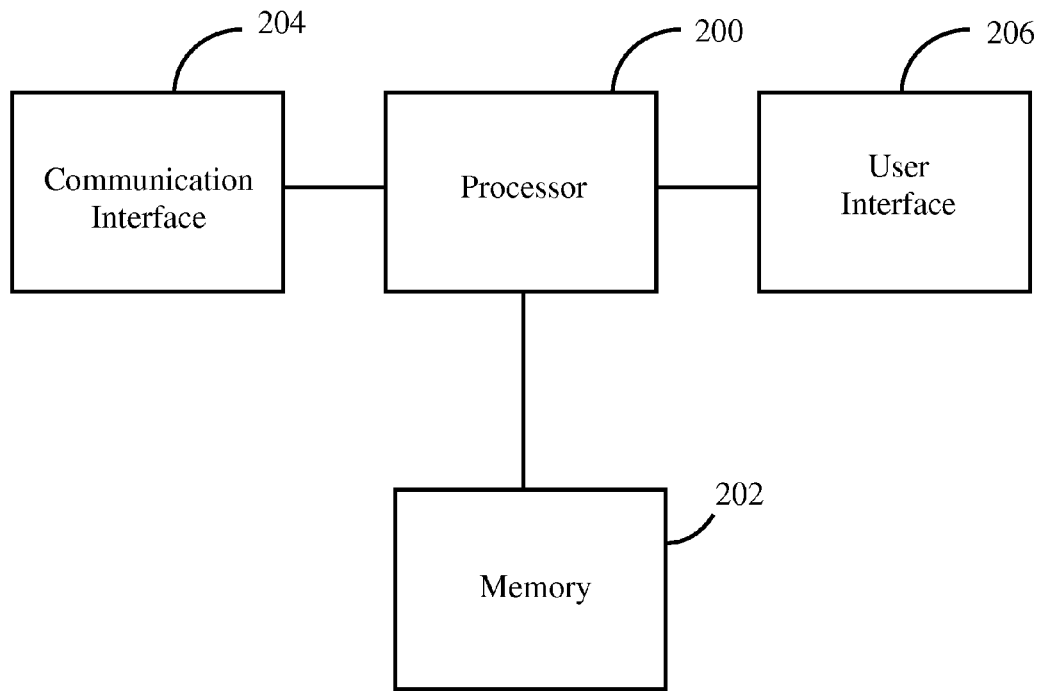
FIG. 2 is a functional block diagram of one embodiment of one of the servers shown in FIG. 1.

FIG. 2 is a functional block diagram of one embodiment of server 102 or server 110. Specifically, FIG. 2 shows processor 200, memory 202, communication interface 204, and user interface 206. It should be understood that not all of the functional blocks shown in FIG. 2 are required for operation of server 102/110 (for example, user interface may not be necessary), that the functional blocks may be connected to one another in a variety of ways, and that not all functional blocks necessary for operation of server 102/110 are shown (such as a power supply), for purposes of clarity.

Server 102 may comprise virtually any commercially-available servers on the market today, including the P4300IP server system manufactured by Intel Corporation of Santa Clara, Calif. Processor 200 provides general operation of server 102 by executing processor-executable instructions stored in memory 202, for example, executable code. Processor 200 typically comprises a general purpose processor, such as any of the Xenon® family of processors manufactured by Intel Corporation of Santa Clara, Calif., although any one of a variety of microprocessors, microcomputers, and/or microcontrollers suitable for a server-type application may be used alternatively.

Memory 202 comprises one or more information storage devices, such as hard drives, RAM memories, ROM memories, flash memories, and/or virtually any other type of electronic, optical, or mechanical memory device, but excludes propagated signals. Typically, memory 202 comprises more than one type of memory. For example, memory 202 may comprise a ROM memory used to store processor-executable instructions for operation of server 102/110, plus one or more hard drives for storing processor-executable instructions relating to entertainment services, such as executable instructions for conducting game play, for ordering food or beverages, controlling jukebox functionality, etc. Memory 202 may also store code for transmission and execution to the wireless communication devices, commonly known as "apps", for providing the entertainment services. One or more apps may be downloaded from server 102 by wireless communication devices in order that the wireless communication devices present the entertainment offered by server 102/110.

Communication interface 204 is electronically coupled to processor 200 and comprises electronic circuitry necessary for server 102/110 to communicate with the wireless communication devices via wireless router 114. In the case of server 110, communication interface 104 comprises circuitry for communicating over wide-area network 112. In another embodiment, communication interface comprises wireless communication circuitry to allow server 102 to communicate directly with wireless communication devices within venue 116 via a LAN. Communication interface 204 comprises circuitry, hardware, software and/or firmware necessary to transmit and receive information sent to or from router 114 via one or more commonly-used network protocols, such as the well-known TCP/IP suite of protocols. Alternatively, or in addition, communication interface could comprise electronics and supporting software/firmware to support other well-known communication types, including Wi-Fi, Bluetooth, wireless telephone communications, fiber-optic communications, and so on.

User interface 206 is coupled to processor 200 and is used to allow an individual to control operation of server 102/110 and/or to receive information from server 102. User interface 206 may comprise one or more touchscreens, pushbuttons, switches, sensors, keypads, and/or microphones that generate electronic signals for use by processor 200 upon initiation by a user. User interface 206 may additionally comprise one or more seven-segment displays, a cathode ray tube (CRT), a liquid crystal display (LCD), one or more light emitting diode displays (LEDD), one or more light emitting diodes (LEDs), light arrays, or any other type of visual display. Further, the electronic display could alternatively or in addition comprise an audio device, such as a speaker, for audible presentation of information to a user. Of course, the aforementioned items could be used alone or in combination with each other and other devices may be alternatively, or additionally, used.

Figure 3:
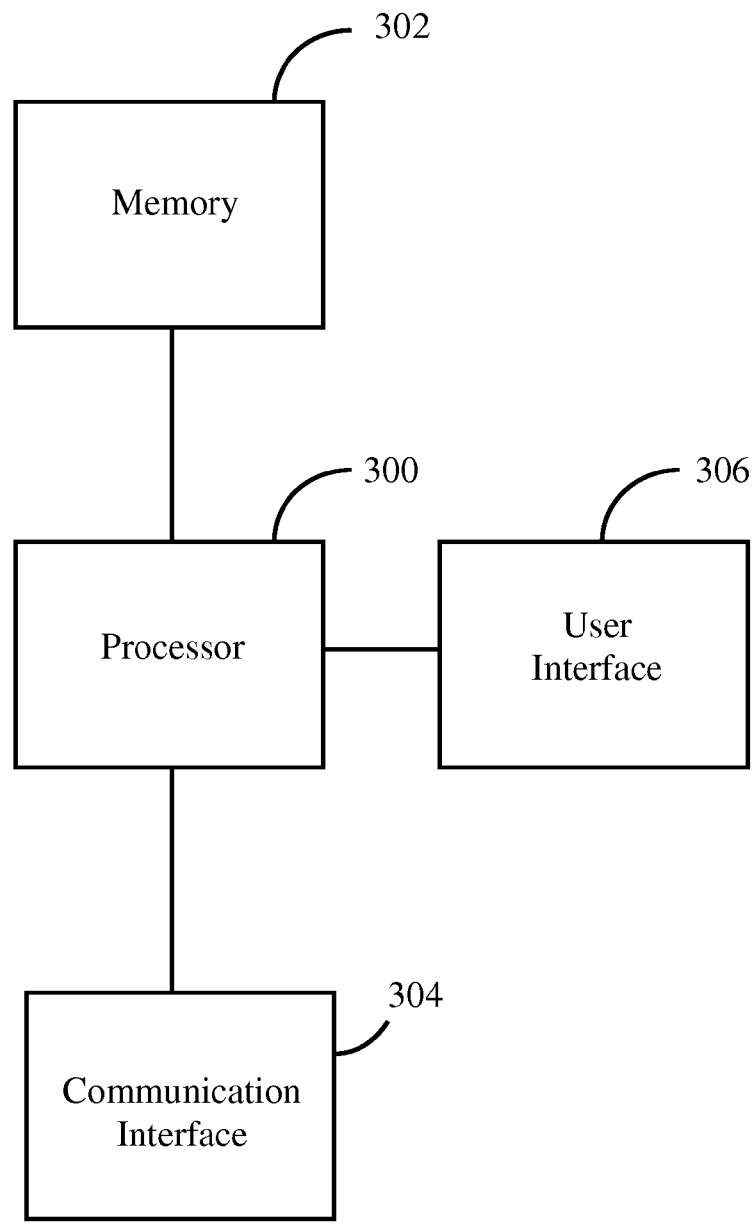
FIG. 3 is a functional block diagram of one embodiment of one of the wireless communication devices shown in FIG. 1.

FIG. 3 is a functional block diagram of one embodiment of a typical wireless communication device, such as one of the wireless communication devices shown in FIG. 1. Specifically, FIG. 3 shows processor 300, memory 302, communication interface 304, and user interface 306. It should be understood that the functional blocks may be connected to one another in a variety of ways and that not all functional blocks necessary for operation of a wireless communication device are shown (such as a power supply), for purposes of clarity.

Each wireless communication device may comprise virtually any commercially-available portable or fixed computing device on the market today having communications capabilities, such as any Smartphone, tablet computer, laptop computer, or even a fixed, "desktop" computer. Processor 300 provides general operation of the wireless communication device by executing processor-executable instructions stored in memory 302, for example, executable code. Processor 300 typically comprises a general purpose processor, such as Tegra 2 processor manufactured by Nvidia Corporation of Santa Clara, Calif., although any one of a variety of microprocessors, microcomputers, and/or microcontrollers suitable for allowing mobile computing/communications may be used alternatively.

Memory 302 comprises one or more information storage devices, such as hard drives, RAM memories, ROM memories, flash memories, and/or virtually any other type of electronic, optical, or mechanical memory device, but excludes propagated signals. Typically, memory 302 comprises more than one type of memory. For example, memory 302 may comprise a ROM memory used to store processor-executable instructions for operation of the wireless communication device, plus RAM memory to store one or more apps that provide entertainment services to a wireless communication device operator.

Communication interface 304 is electronically coupled to processor 300 and comprises electronic circuitry necessary for wireless communications with server 102 or 110 via wireless router 114 or via a cellular network. Typically, communication interface comprises circuitry, hardware, software and/or firmware necessary to transmit and receive information sent via one or more commonly-used network protocols, such as the well-known TCP/IP suite of protocols. Alternatively, or in addition, communication interface could comprise electronics and supporting software/firmware to support a variety of well-known communication types, including Ethernet, Wi-Fi, Bluetooth, fiber-optic communications, cellular (such as LTE or WiMax), and so on.

User interface 306 is coupled to processor 300 and is used to allow an operator of the wireless communication device to engage in entertainment or other services offered by server 102/110. User interface 306 may comprise one or more touchscreens, pushbuttons, switches, sensors, keypads, and/or microphones that generate electronic signals for use by processor 300 upon initiation by customers. User interface 306 may additionally comprise one or more liquid crystal displays (LCDs), one or more light emitting diode displays (LEDDs), one or more light emitting diodes (LEDs), light arrays, or any other type of visual display. Further, user interface 306 could, alternatively or in addition, comprise an audio device, such as a speaker, for audible presentation of information to an operator. Of course, the aforementioned items could be used alone or in combination with each other and other devices may be alternatively, or additionally, used. Typically, input device 306 comprises a widely-known touchscreen device capable of displaying information and receiving operator input.

Figure 4:
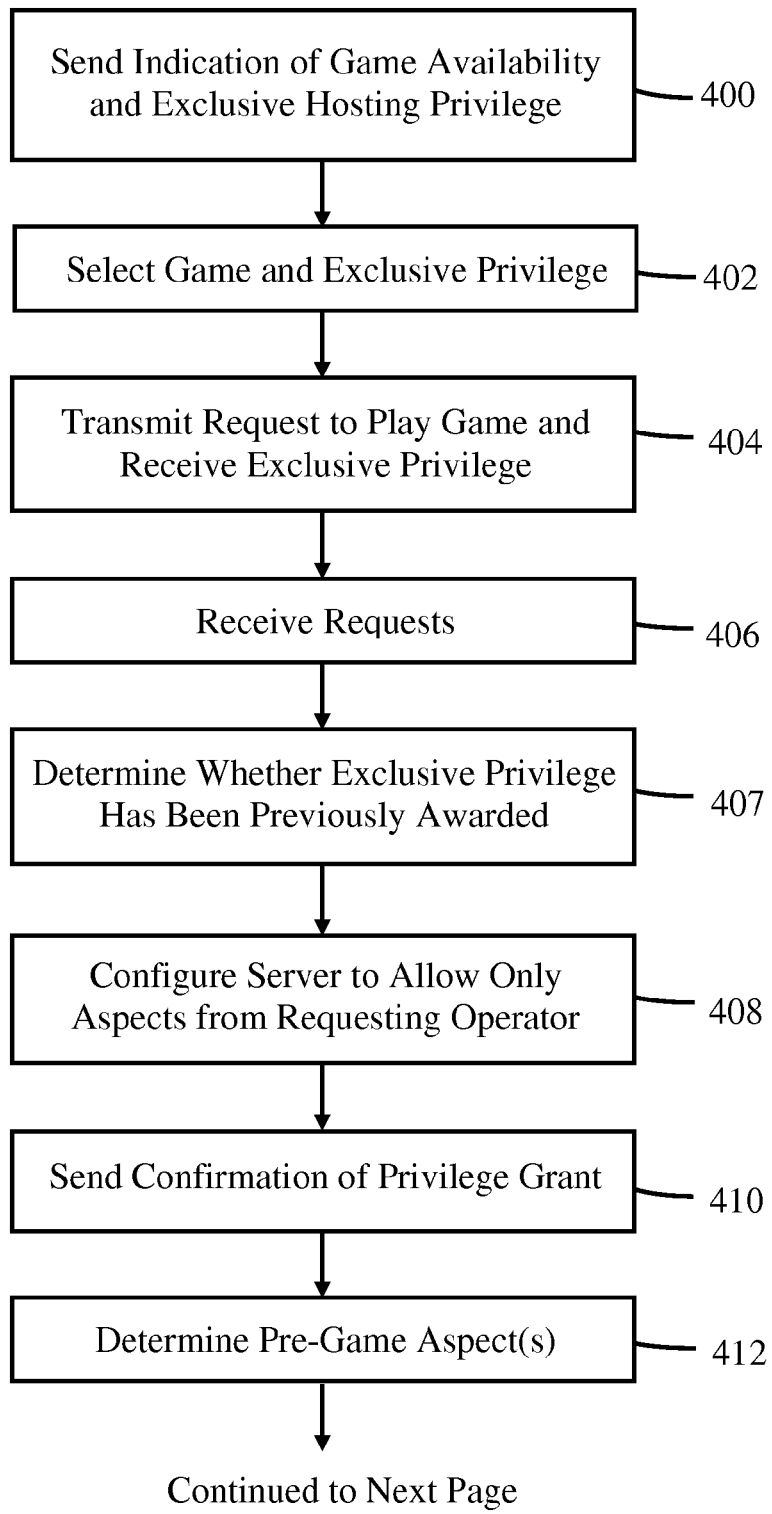
FIG. 4 is a flow diagram illustrating one embodiment of a method to allow a wireless communication device operator to control one or more aspects of a multi-player game.
Figure 4:
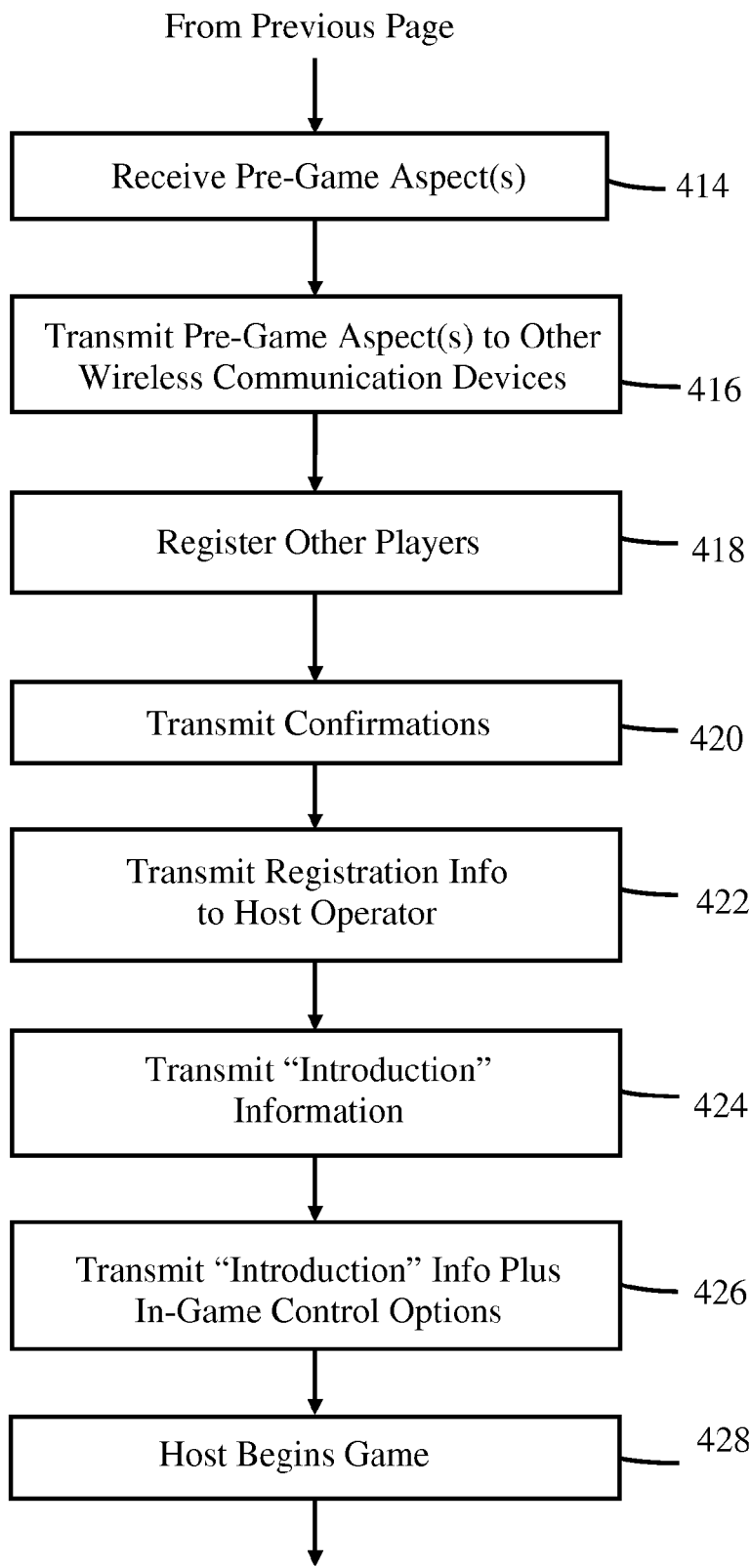
Figure 4:
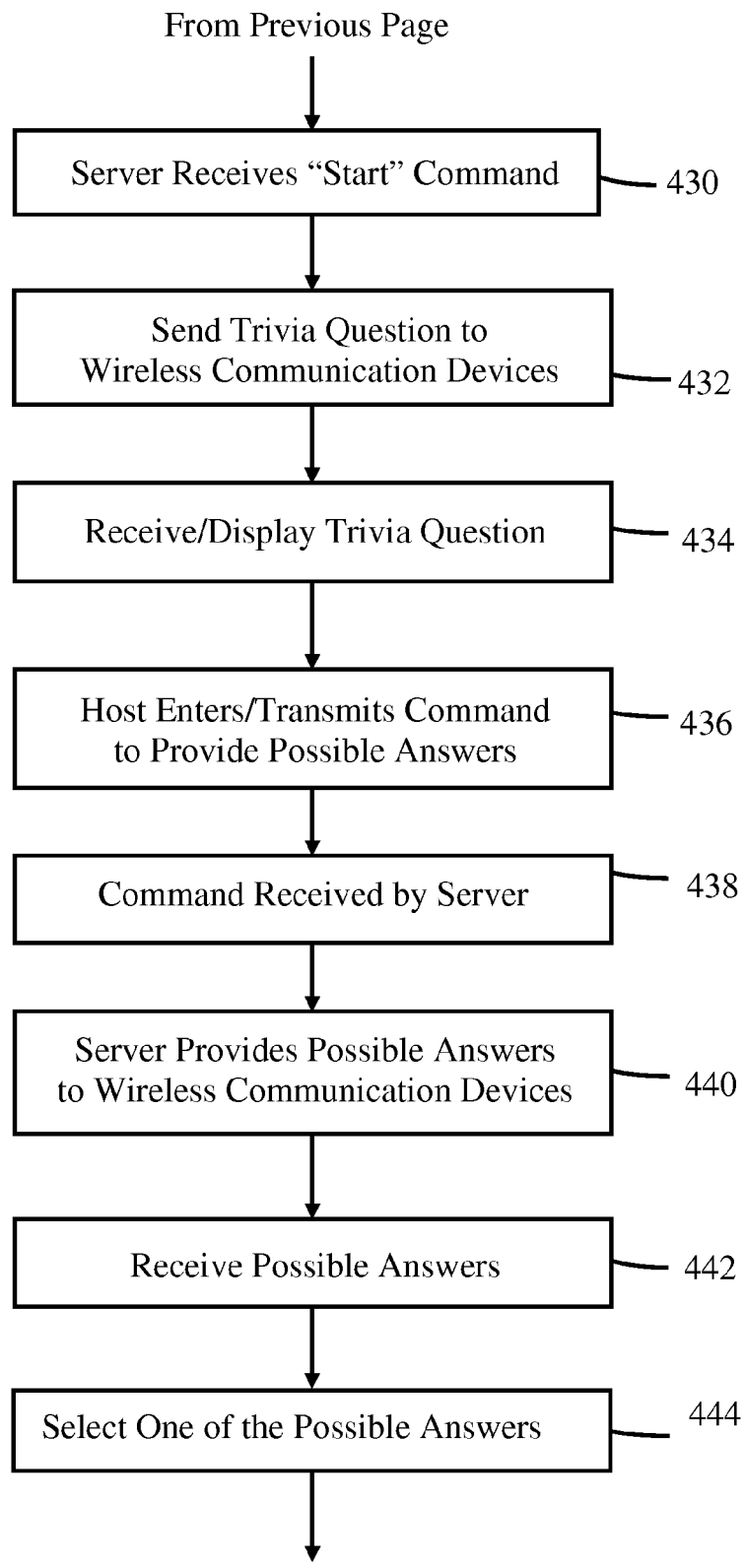
Figure 4:
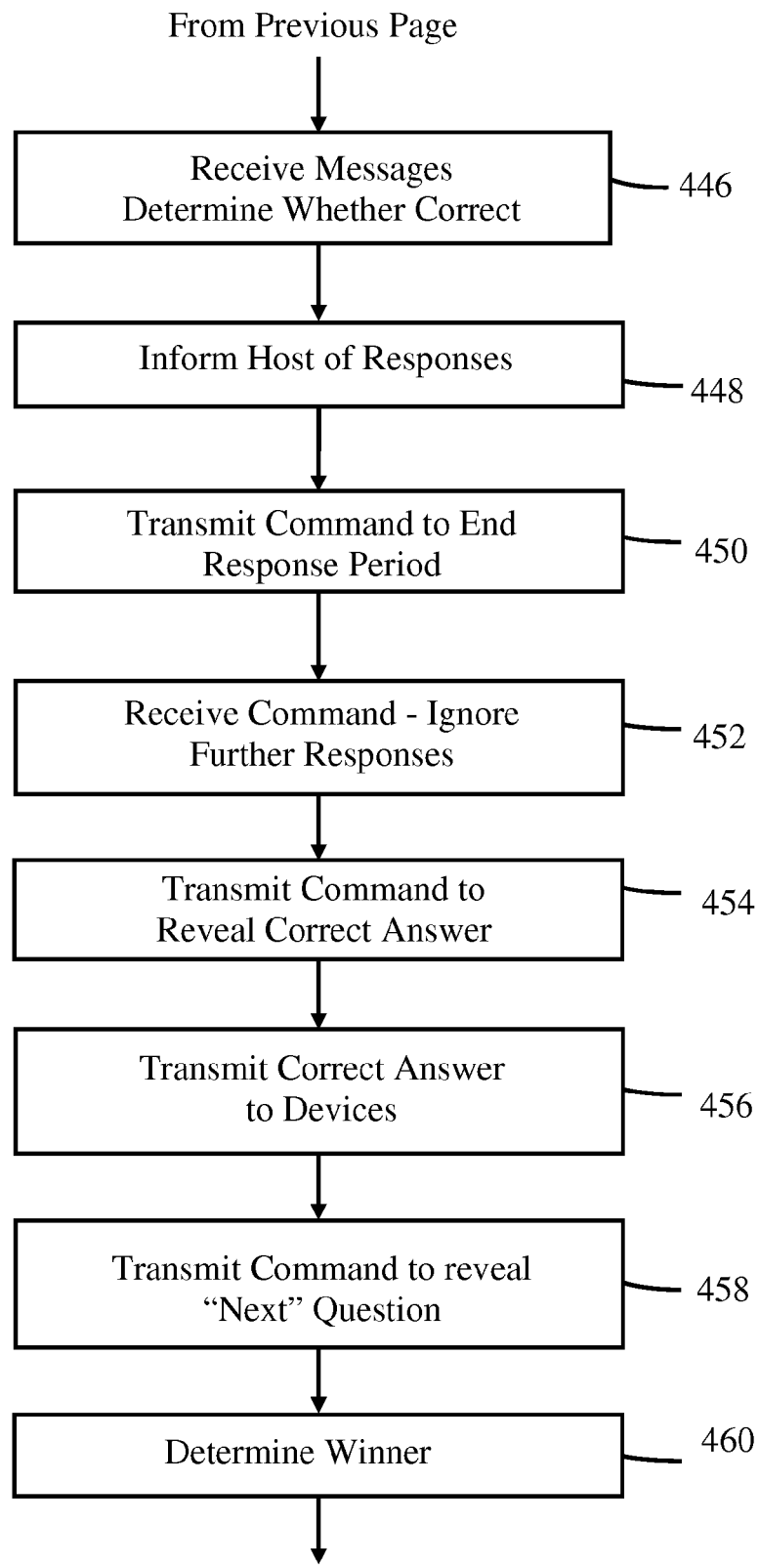
Figure 4:
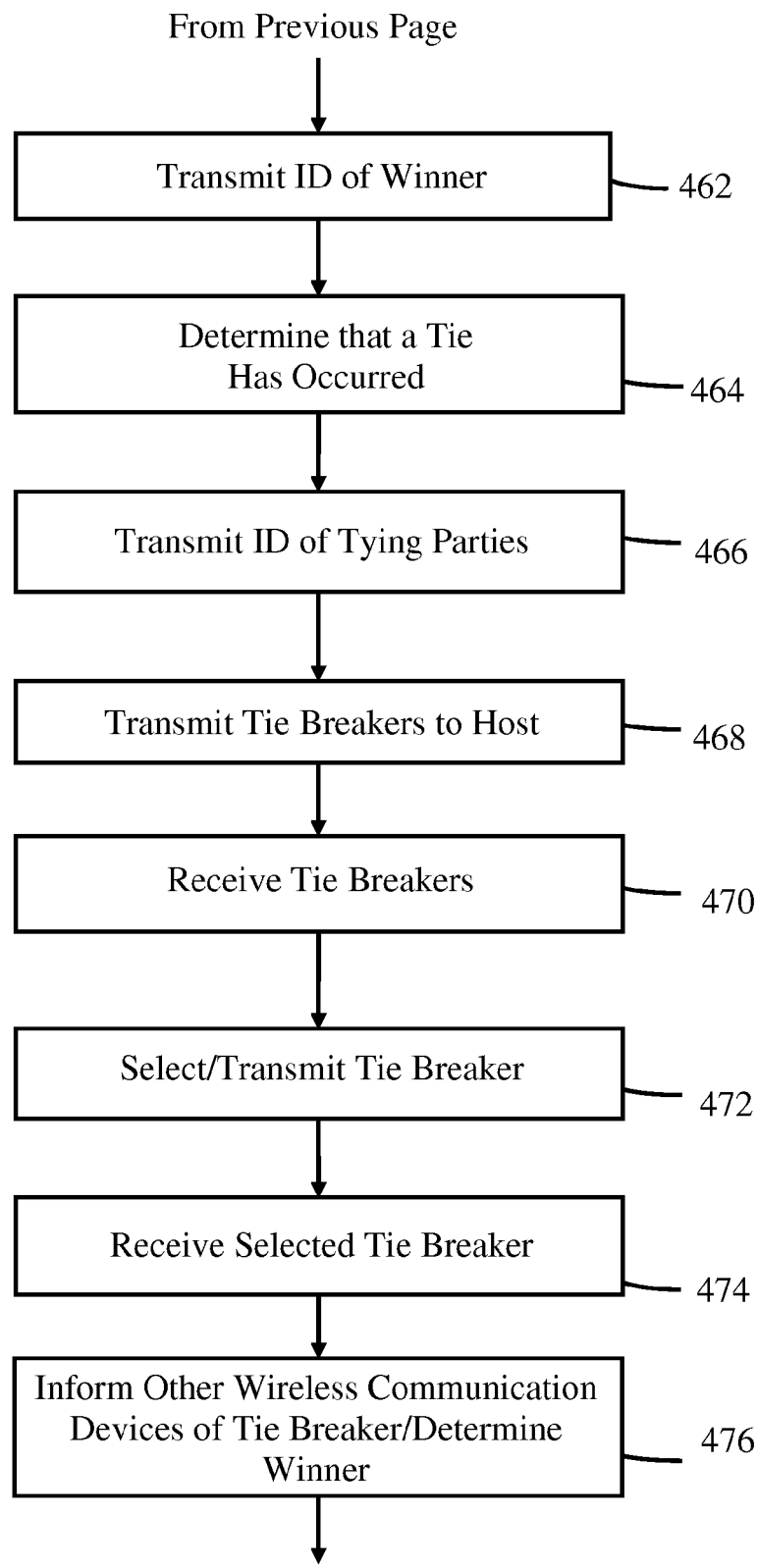
Figure 4:
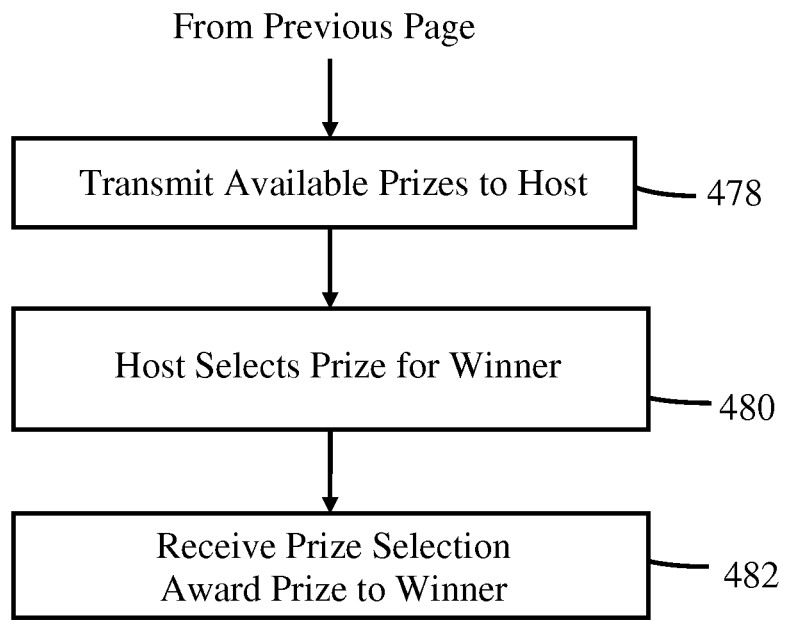

FIG. 4 is a flow diagram illustrating one embodiment of a method to allow a wireless communication device operator to control one or more aspects of a multi-player game. The method is performed by a combination of a wireless communication device, such as wireless communication device 104 in FIG. 1, and server 102, server 110, or both. Processor 300 in the wireless communication device executes processor-executable instructions stored in memory 302 that causes the wireless communication device to perform the method pertaining to the wireless communication device, while processor 200 in either server 102, server 110, or both, executes processor-executable instructions stored in a memory 202 associated with the server(s) that causes the server(s) to perform the method pertaining to the server(s). Although the method of FIG. 4 is described in particular as certain operations of the method occurring at server 102/110 or at the wireless communication device, it should be understood that the concepts described could be applied to other embodiments, such as an embodiment where an "app" runs on the wireless communication device that provides entertainment functionality to an operator of such a device, without departing from the general inventive concepts described herein.

It should be further understood that in some embodiments, not all of the steps shown in FIG. 4 are performed, and that the order in which the steps are carried out may be different in other embodiments. Further, it should be understood that some minor method steps may have been omitted for purposes of simplifying the method description unnecessary for one skilled in the art to make and use the inventive concepts described. Finally, while the steps are reference only to server 102 in the following discussion, it should be understood that it is intended that the steps be applicable to server 110 in the alternative, or shared between server 102 and server 110.

At block 400, server 102 sends a signal to a plurality of wireless communication devices and/or public display monitor 124 indicating an availability of entertainment services, for example in the form of one or more multi-player games, and an indication of an exclusive privilege for one of the wireless communication devices to exclusively control one or more aspects of the game. In another embodiment, one or more "apps" are downloaded from server 102 by a plurality of wireless communication devices, and one of the apps provides an indication to an operator of each wireless communication device that entertainment services are available to each operator in the form of one or more multi-player games, and an indication that at least one of the multi-player games may be controlled by an operator of one of the plurality of wireless communication devices. For example, server 102 may send a signal to a plurality of wireless communication devices that a particular trivia game is available for exclusive control by one of the wireless communication device operators. In one embodiment, a list of operator-controllable entertainment services is displayed on each wireless communication device in response to an operator requesting such a list. For example, an operator may press a "Host" icon displayed on user interface 306, whereupon a list of entertainment services that may be controlled, or "hosted", or granted an exclusive privilege to control one or more aspects of the game by one of the wireless communication device operators is presented to the operator of the wireless communication device. The list may include such games as trivia game, poker, bingo, sports games, a DJ application where an operator may compile a song list for presentation to the venue via a jukebox located in the venue, etc. and is typically provided by server 102 in response to the operator pressing the "Host" icon. In another embodiment, such a list of entertainment services available for hosting is pre-stored in memory 302 of each wireless communication device. Hosting an entertainment service comprises exclusively controlling certain aspects of the entertainment, such as determining a pace or rate at which a game is played, determining a minimum or maximum number of players of a game, inviting certain players and/or excluding others from game play, etc. Generally, only one host is given exclusive hosting privileges for each entertainment service. For example, one individual may be given exclusive hosting privileges to play a pop-music trivia game, while another individual may, simultaneously, be granted exclusive hosting privileges to play a sports trivia game.

At block 402, an operator of one of the plurality of wireless communication devices selects an entertainment service available to the operator for hosting, as displayed at block 400. For purposes of the remaining discussion of the method of FIG. 4, it will be assumed that the request received by server 102 is a request to host a multi-player trivia game (i.e., be granted the exclusive privilege to control one or more aspects of the game), although the inventive concepts described can be applied to other game types, such as bingo, poker, sports-related games, etc. Multi-player games refer to games where two or more wireless communication device operators play a game with or against each other. The operator's request is received by processor 300 which, in turn, generates a request to receive the exclusive privilege for transmission to server 102. The request may include an identification of the wireless communication device, such as an IP address, MAC address, or an identification of the operator, such as a name, a digital image, or a username of the operator. The operator identification information may have previously been provided to server 102 during an initial registration process between the operator and server 102, or it may be provided at block 402.

At block 404, the request to play the multi-player game and receive the exclusive privilege for the game is transmitted by the wireless communication device to server 102.

At block 406, the request to play the game and receive the exclusive privilege to the game is received by server 102. Server 102 may be programmed to only allow a certain number of entertainment types to occur at one time. Such limitations may be based on a venue size, e.g., a number of patrons that the venue can accommodate at any particular time, a time of day, or other factors. For instance, in a venue able to accommodate 200 patrons, server 102 may be programmed to only allow 1 trivia game and 1 poker game from the hours of noon and 8 pm, and then allow 3 trivia games, 2 poker games, and 1 sports-related game to be played at one time after 8 pm. Thus, if such a limitation on the number of games is imposed on server 102, server 102 checks memory 202 to determine if the maximum number of games has been reached. If so, server 102 may transmit a message back to the requesting operator indicating that the request has been rejected.

At block 407, processor 200 determines whether another wireless communication device operator has already been assigned the exclusive privilege to play the multi-player game requested by the wireless communication device at block 406. If so, server 102 may transmit a message back to the requesting operator indicating that the request has been rejected.

At block 408, if no other wireless communication device operator has been granted the exclusive hosting privilege, server 102 is configured so that only the operator who transmitted the request at block 402 may control aspects of the trivia game. In one embodiment, this is accomplished by processor 200 storing identification information related to the requesting operator or the operator's wireless communication device in memory 202 and associating the identification information with the game selected by the operator. Then, processor 200 compares the identification information received in subsequent transmissions from various wireless communication devices, and only allowing control of the trivia game by transmissions having identification information matching the identification information of the requesting operator as stored in memory 202.

At block 410, server 102 sends a confirmation to the requesting operator granting the requesting operator exclusive hosting privileges of the trivia game. The requesting operator may now be referred to as the "host operator" and the wireless communication device used by the host operator known as the "host wireless communication device". Processor 200 may increment a counter stored within memory 202 indicating that a trivia game is in progress, for use in determining a maximum permissible number of trivia games that may be played in venue 116 simultaneously. In one embodiment, server 102 generates a passcode typically comprising a numeric, alpha-numeric code, or other code or "secret" that limits game play to only those who know the passcode, and transmits it to the requesting operator. The requesting operator may then invite others to participate in the trivia game by verbally announcing, or otherwise communicating, the passcode to other potential players located within venue 116. In other embodiments, the passcode may be distributed in any number of different ways, including by direct transmission from server 102 locally to potential players located within venue 116 (in one embodiment, via Wi-Fi, Bluetooth, iBeacon, etc. to ensure the passcode is only received by players located at venue 116), display on one or more monitors located within venue 116, and/or an audio announcement from the one or more monitors. In this way, participation in the game is limited to only those potential players who receive the passcode from the requesting operator.

At block 412, the host operator may determine one or more "pre-game aspects" of the trivia game, comprising features of the trivia game that may be defined before game play begins, such as a game version, game type or sub-type, a game start time, a game speed (e.g. a rate at which the game is intended to progress, for example, fast, moderate, slow, etc.), a game duration, a maximum number of players, a minimum number of players, a restriction relating to the location of players (i.e., restricting game play to individuals located with venue 116, within venue 116 and 118, etc.), or any other attribute related to pre-game aspects selected by the host operator. Each of these aspects may be chosen by the host operator and a command instructing server 102 to apply the pre-game aspects defined by the host operator. As an example, if a trivia game was selected at block 402 by the requesting operator, the pre-game aspects received from the requesting operator from the requesting operator may comprise an identification of a trivia game related to a particular genre, such as "current events", "movies", "sports", "baseball", "music", or virtually any type of trivia game. Other version types may include a type of poker game (e.g., 5 card draw, 7 card stud, Texas Hold 'Em, etc). With relation to bingo, the request may comprise a selection of one or more winning bingo patterns to include in the bingo game. In any case, a command to apply the pre-game aspects defined by the host operator is provided to processor 300 and then transmitted to server 102 via communication interface 304.

At block 414, server 102 receives the command transmitted at block 412 from the host wireless communication device.

At block 416, server 102 transmits at least some of the pre-game aspects to the plurality of wireless communication devices to inform their respective operators of the existence of the game hosted by the requesting operator, and may comprise an identification of the host operator (e.g., operator's actual name or username, a digital image of the host operator, etc). For instance, server 102 may transmit a message to the plurality of wireless communication devices that a sports trivia game will be hosted by host operator "JohnD" at 8:30 pm or as soon as 50 people have signed into server 102 to play the trivia game, as determined by the host operator.

At block 418, server 102 receives one or more requests from operators of other wireless communication devices to play the trivia game hosted by the host operator. In one embodiment, the requests each comprise the passcode that was generated by server 102 at block 410. As each request is received, processor 200 registers these devices and/or their associated operator by associating identification information contained in each request with the trivia game and storing this information in memory 202. In the case where a passcode is used, processor 200 compares the passcode in each request to ensure that it matches with the passcode generated by server 102 at block 410 and only allows those requests comprising the correct passcode to participate in the game.

At block 420, server 102 transmits a confirmation to the wireless communication devices that requested to play the trivia game that they have been registered to play the game. In response, each wireless communication device may provide additional information to server 102, such as the number of players playing as a team via a particular communication device, a team name, one or more individual names, one or more photos, for example, photos of the team members, and/or other information.

At block 422, server 102 transmits a signal to the host wireless communication device when one or more other wireless communication devices have registered to play the game. This information is then displayed to the host operator by the host wireless communication device to allow the host operator to track the rate at which people sign up to play the game and to know the overall number of people who have registered. In one embodiment, the additional information described with respect to block 420 is also provided to the host wireless communication device. The host operator may be given an opportunity to accept or reject a particular individual or team from participating in the game. For example, the host operator may find an individual/team name offensive. In that case, the host operator may transmit a message to server 102, rejecting a particular individual or team associated with one or more wireless communication devices that submitted a request to play the game. In response, server 102 may transmit an indication to the rejected team or individual's wireless communication device of the rejection and, in one embodiment, an invitation to enter a different individual/team name, substitute or drop one or more team members, etc. If a change is made by the rejected individual/team, a re-request may be transmitted to server 102 for approval by the host operator, as discussed previously.

At block 424, server 102 transmits a signal to the wireless communication devices for each wireless communication device to display an "introduction" screen to operators of the wireless communication devices. The introduction screen could be pre-loaded onto the wireless communication devices and displayed when commanded by server 102.

At block 426, sever 102 transmits a signal to the host wireless communication device for the host wireless communication device to display a similar "introduction" screen that is displayed by the other wireless communication devices that signed up to play the trivia game. However, the host wireless communication device may additionally display one or more icons, text, and/or other visual symbols for controlling "in-game aspects" of the trivia game. Such in-game aspects may comprise a "Start" function for instructing server 102 to begin the trivia game, a "Next" icon to instruct server 102 to advance to the next operating state of the trivia game, e.g., to provide the next question in the game, to provide one or more possible answers, to stop accepting answers from wireless communication devices, to present the correct answer, to show a scoreboard of top-performing operators, etc. In other game types, the host operator's display may include a "Deal" icon, a "Next Pick" bingo ball selection icon, a "Next Play" icon in a sports game, or other symbol applicable aspects of particular games.

At block 428, the host operator begins the game by providing a command to user interface 306, such as touching a "Start Game" icon. The command is received by processor 300 and transmitted to server 102.

At block 430, server 102 receives the "Start Game" command from the host wireless communication device.

At block 432, in response to the receiving the "Start Game" command at block 430, server 102 sends a first trivia question to each wireless communication device that registered to play the trivia game at blocks 418 and 420, and to the host wireless communication device. Alternatively, or in addition, server 102 sends the first trivia question to one or more public monitors 124.

At block 434, the first trivia question is received by each wireless communication device that registered with server 102 to play the trivia game, including the host wireless communication device. The first trivia question is displayed to each operator of the wireless communication devices via user interface 306, respectively. In one embodiment, the trivia game does not progress to the next state; that of displaying two or more possible answers to the trivia question, until an indication from the host operator is received by server 102.

At block 436, after receiving the first trivia question, the host operator may provide a command to user interface 306 for server 102 to provide two or more possible answers to the first trivia question. Typically four or five possible answers are provided. The command is received by processor 300 and a message is transmitted to server 102 indicative of the host operator's desire for server 102 to present the two or more possible answers. In this way, the host operator can control an aspect of the game related to the rate or speed at which the game is played.

At block 438, server 102 receives the command sent by the host wireless communication device to provide the two or more possible answers.

At block 440, server 102 sends the two or more possible answers to the wireless communication devices that registered to play the trivia game at blocks 418 and 420 and to the host wireless communication device. Alternatively, or in addition, server 102 sends the two or more possible answers to one or more public monitors 124 for display.

At block 442, the two or more possible answers are received by the wireless communication devices, including the host wireless communication device and/or the public monitor(s) 124, and presented for display.

At block 444, any of the wireless communication devices may respond to the two or more possible answers provided by server 102 and select one of the answers believed to be the correct answer to the trivia question provided by server 102. Typically, players have a predetermined time period in which to respond, such as thirty seconds. This time may be configurable by the host operator prior to the start of the trivia game as a "pre-game aspect" to define response times greater or less than 30 seconds.

At block 446, server 102 monitors incoming messages from wireless communication devices to determine which wireless communication devices have selected one of the two or more questions, to determine if the answer selected by each wireless communication device operator matches a correct answer, and to store the result of such determination in memory 202 for each responding wireless communication device. In one embodiment, server 102 monitors for incoming messages until the predetermined time period in which to respond expires.

At block 448, as incoming messages from the wireless communication devices are received in block 446, server 102 may transmit status information to the host wireless communication device status informing the host operator of how many responses have been received and/or how many responses contained the correct answer.

At block 450, in an embodiment that does not use a predetermined time period in which to respond to questions, the host operator decides when to terminate the response period by providing a command to server 102 via user interface 306 to end the response period. Again, this enables the host operator may determine the pace, speed, or rate of game play.

At block 452, the command from the host operator to terminate the response period is received by processor 300 and transmitted to server 102 and, in response, ignores subsequent answers from wireless communication devices who have not yet responded to the trivia question. In one embodiment, a message is transmitted from server 102 to any wireless communication device that that did not provide a response in time indicating that the time period for response has ended.

At block 454, in one embodiment, server 102 does not reveal the correct answer to the trivia question until an indication is received from the host wireless communication device. In this embodiment, the host operator provides an indication via user interface 306 for server 102 to reveal the correct answer, then processor 300 receives and transmits the indication to server 102 where the indication is received. In another embodiment, server 102 reveals the correct answer soon after the response time has expired.

At block 456, server 102 reveals the correct answer to the trivia question by transmitting an indication of the correct answer to the wireless communication devices, including the host operator and, in some embodiments, to one or more public viewing monitors 124.

At block 458, at some time after the correct answer has been revealed by server 102, the host operator may provide a command to user interface 306 for server 102 to provide the next trivia question, then processor 300 receives and transmits the command to server 102 where it is received. Blocks 432 through 458 are then repeated until all of the questions have been asked and answered. In one embodiment, after a predetermined number of questions have been asked and answered, a "leader board" may be transmitted to each of the wireless communication devices, presenting an indication of the top individuals or teams who have answered the most questions correctly or who have the highest cumulative point total at that point in the game.

In one embodiment, at some point after the game has been started (i.e., in trivia, after the first question has been asked), one or more individuals or teams may be allowed to join a game already in progress. In this embodiment, a request to join the game is transmitted from a requesting wireless communication device and received by server 102. Server 102, in response, transmits a query to the host operator asking permission to allow the late-requesting wireless communication device to join the game already in progress. The host operator may then transmit a message to server 102 indicating either acceptance or a rejection of the request. In another embodiment, the request from the late-requesting wireless communication device is automatically rejected if a response from the host operator is not received within a predetermined time period after transmitting the query, such as 1 minute. In the case of acceptance by the host operator, server 102 adds the late-requesting wireless communication device as a participating member of the game, and a message is transmitted from server 102 to the late-requesting wireless communication device indicating approval. Thereafter, responses to the game received from the late-requesting wireless communication device are evaluated by server 102.

At block 460, server 102 determines a winner of the game, for example which operator has answered the most questions correctly, which operator has accumulated the most points based on the number of questions answered correctly and the time in which the answers were provided, or some other metric.

At block 462, server 102 transmits an identification of the winner determined at block 460 to the wireless communication devices, including the host operator and, in some embodiments, to one or more public viewing monitors 124. The identification could comprise a name, digital image, username, or some other identification information provided to server 102 during the game registration process or a previous registration with server 102.

At block 464, server 102 may determine that a tie has occurred between or among two or more operators.

At block 466, an indication of the tie is transmitted to the wireless communication devices, host wireless communication device, and/or public display monitor 124 along with, in one embodiment, identification information of the tying operators.

At block 468, in one embodiment, a selection of "tie-breakers" is transmitted to the host wireless device and, in some embodiments, to the other wireless communication devices. The selection of tie-breakers may comprise a choice between two or more additional trivia questions, two or more categories of trivia, or a choice between two or more other types of game play that decides which of the tying operators wins the game. In another embodiment, a selection of tie-breakers is not transmitted. In this case, server 102 simply continues game play to another round and continues to do so until the tie is broken.

At block 470, the selection of "tie-breakers" and identification of the tying operators is received by the wireless communication devices and the host wireless communication device and presented to their respective operators, each via user interface 306.

At block 472, the host operator selects one of the tie-breakers for use in breaking the tie, and the host wireless communication device transmits an indication to server 102 informing server 102 of the selection. None of the other wireless communication devices may transmit such a selection to server 102, as only the host operator may do so. In an embodiment where a trivia question is selected by the host operator, the indication comprises an identification of the trivia question selected. In an embodiment where a category of trivia is selected, the indication comprises an identification of the trivia category.

At block 474, the indication from the host wireless communication device at block 470 is received by server 102.

At block 476, in one embodiment, in response to a selected trivia question, server 102 provides an indication to the wireless communication devices of the host operator's selection. In an embodiment where the indication comprises a category of trivia, server 102 selects a trivia question from memory 302 in accordance with the selected trivia category, then sends the selected trivia question to the wireless communication devices, host wireless communication device, and public display monitor(s) 124. The steps of blocks 436 (operator choosing when to allow server 102 to reveal possible answers to the trivia question) to 460 (server 102 determines winner) are then repeated.

At block 478, in one embodiment, server 102 provides a selection of prizes or rewards to the host wireless communication device for selection by the host operator of a prize or reward to be given to the winner. Such prizes or awards could comprise cash, coupons, or points for use in a pre-existing rewards system offered by venue 116 for the winner to purchase food or beverages from venue 116 in the future.

At block 480, the host operator selects one of the prizes or rewards for the winner and transmits his or her selection to server 102.

At block 482, server 102 receives the prize or reward selection from the host wireless communication device and provides a credit to an account associated with the winner. The credit could comprise an electronic coupon for a reduction in price of a future food or beverage item, a credit redeemable for cash or for other services related to venue 116, such as a credit towards a purchase of future gaming activities, for purchasing music for playback on a jukebox in venue 116, etc.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention may comprise a computer-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

We claim:

1. A server for allowing a wireless communication device operator to control one or more aspects of a multi-player game offered by the server, comprising:
 a communication interface for sending and receiving information from a plurality of wireless communication devices over a network;
 a memory for storing processor-executable instructions; and
 a processor coupled to the memory and the communication interface for executing the processor-executable instructions that cause the server to:
  send a signal to the plurality of wireless communication devices indicating an availability of the multi-player game and an indication of an availability of an exclusive privilege for one of the wireless communication device operators to exclusively control one or more aspects of the multi-player game;
  receive a request from a first wireless communication device for a first wireless communication device operator to receive the exclusive privilege;
  determine whether another wireless communication device operator has already been assigned the exclusive privilege to play the multi-player game;
  assign the exclusive privilege to the first wireless communication device if the exclusive privilege has not been assigned to another wireless communication device operator; and
  send a confirmation to the first wireless communication device indicating that the first wireless communication device operator has been granted the exclusive privilege.

2. The server of claim 1, wherein the processor-executable instructions further comprise instructions that cause the server to:
 send a notification to the plurality of wireless devices that the exclusive privilege is no longer available after sending the confirmation to the first wireless communication device.

3. The server of claim 2, wherein the notification further comprises an indication of an identity of the first wireless communication device operator.

4. The server of claim 1, wherein one of the game aspects comprises advancing the game to a subsequent state.

5. The server of claim 1, wherein one of the game aspects comprises a rate at which the game is played.

6. The server of claim 1, wherein one of the game aspects comprises a start time of the game.

7. The server of claim 1, wherein one of the game aspects comprises a minimum number of players required to start the game, wherein the processor-executable instructions further comprise instructions that cause the server to;
 receive a number of requests to participate in the game from the plurality of wireless communication devices;
 wherein the game is started by the server when the number of requests to participate in the game meets or exceeds the minimum number of players defined by the first wireless communication device operator.

8. The server of claim 1, wherein the processor-executable instructions further comprise instructions that cause the server to:
 receive responses from one or more wireless communication devices as the game is played; and
 provide an indication to the first wireless communication device of a number of wireless communication devices that have provided a response to the server as the game is played.

9. The server of claim 1, wherein the processor-executable instructions further comprise instructions that cause the server to:
 receive a number of requests from a plurality of the wireless communication devices to participate in the game;
 register one or more of the plurality of wireless communication devices to play the game;
 provide an indication to the first wireless communication device of the number of wireless communication devices that have successfully registered to play the game.

10. The server of claim 1, wherein the processor-executable instructions further comprise instructions that cause the server to:
 determine that a tie has occurred at the conclusion of the game between at least a second wireless communication device operator and a third wireless communication device operator;
 provide at least two tie-breakers to the first wireless communication device;
 receive a selection from the first wireless communication device indicative of one of the at least two tie-breakers selected by the first wireless communication device operator;
 initiate a tie-breaking round of game play between the second wireless communication device operator and the third wireless communication device operator based on the tie-breaker selected by the first wireless communication device operator.

11. The server of claim 1, wherein the aspects comprise pre-game aspects related to aspects of the game selected prior to a start of the game and in-game aspects related to aspects of the game that occur as the game is played.

12. The server of claim 1, wherein each of the plurality of wireless communication devices is located within a public venue.

13. The server of claim 1, wherein the processor-executable instructions further comprise instructions that cause the server to:
 advance the game to a first state of play;
 wait to advance the game to a subsequent state of play; and
 advance the game to the subsequent state of play only after receiving a command to advance the game to the subsequent state from only the first wireless communication device.

14. A wireless communication device for allowing an operator of the wireless communication device to control one or more aspects of a multi-player game offered by a server, comprising:
 a communication interface to transmit and receive information with the server;

a user interface to display information to the operator and to receive input from the operator;

a memory for storing processor-executable instructions; and a processor coupled to the communication interface, the user interface, and the memory for executing the processor-executable instructions that cause the wireless communication device to:

request an exclusive right to control one or more aspects related to the multi-player game from the server;

receive the exclusive right to control one or more aspects related to the multi-player game; and after the game has started, transmit a command to the server for controlling an aspect of the multi-player game as the game is being played.

15. The wireless communication device of claim 14, wherein the aspect comprises an advancement of the game to a subsequent state.

16. The wireless communication device of claim 14, wherein the aspect comprises a rate at which the game is played.

17. The wireless communication device of claim 14, wherein the processor-executable instructions further comprise instructions that cause the wireless communication device to:

before the game has started, transmit a command to the server for controlling a second aspect of the multi-player game prior to a start of the multi-player game.

18. The wireless communication device of claim 15, wherein the second aspect comprises a start time of the multi-player game.

19. The wireless communication device of claim 15, wherein the second aspect comprises a restriction on who may participate in the multi-player game.

20. The wireless communication device of claim 13, wherein the processor-executable instructions further comprise instructions that cause the wireless communication device to:

receive a status from the server indicative of a number of players who have provided a response to an advancement of a state of game play by the server.

* * * * *